(12) United States Patent
Strunk et al.

(10) Patent No.: US 8,620,962 B1
(45) Date of Patent: Dec. 31, 2013

(54) SYSTEMS AND METHODS FOR HIERARCHICAL REFERENCE COUNTING VIA SIBLING TREES

(75) Inventors: John Strunk, Apex, NC (US); Douglas Santry, Raleigh, NC (US); Sriram Venketaraman, Bangalore (IN); Vaijayanti Bharadwaj, Pune (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/401,678

(22) Filed: Feb. 21, 2012

(51) Int. Cl.
*G06F 17/30* (2006.01)

(52) U.S. Cl.
USPC .......................................... 707/797

(58) Field of Classification Search
USPC .......................................... 707/797
See application file for complete search history.

(56) References Cited

U.S. PATENT DOCUMENTS

| | | | |
|---|---|---|---|
| 8,032,498 B1 * | 10/2011 | Armangau et al. | 707/690 |
| 8,190,850 B1 * | 5/2012 | Davenport et al. | 711/202 |
| 8,250,035 B1 * | 8/2012 | Tang et al. | 707/639 |
| 8,412,688 B1 * | 4/2013 | Armangau et al. | 707/695 |
| 2004/0179018 A1 * | 9/2004 | Sabella et al. | 345/536 |
| 2005/0065986 A1 * | 3/2005 | Bixby et al. | 707/204 |

OTHER PUBLICATIONS

Ohad Rodeh, "B-trees, Shadowing, and Clones," ACM Transactions on Computational Logic, vol. V, No. N. Aug. 2007, 26 pgs.

* cited by examiner

*Primary Examiner* — Apu Mofiz
*Assistant Examiner* — Dara J Glasser
(74) *Attorney, Agent, or Firm* — Perkins Coie LLP

(57) ABSTRACT

Systems and methods for hierarchical reference counting via sibling trees are provided. The hierarchical data structure, together with its associated operations, can efficiently maintain reference counts and significantly reduce input/output (IO) operations compared to traditional techniques. The data structure presented here is applicable to any directed acyclic graph (DAG-type) structure where reference counts are used. Various embodiments of the present invention use a data structure to maintain a "sibling pointer" (pointing to the sibling node as a way to avoid reference count updates) and a "sibling count." When nodes in the tree diverge, the sibling pointer and sibling count are updated as opposed to directly manipulating the reference counts of the children of the diverging nodes. Various other embodiments can use additional entries or fields that allow for improved efficiency and advantages.

24 Claims, 14 Drawing Sheets

SYSTEMS AND METHODS FOR HIERARCHICAL REFERENCE COUNTING VIA SIBLING TREES

TECHNICAL FIELD

Various embodiments disclosed herein generally relate to storage system data structures. More specifically, some embodiments relate to systems and methods for hierarchical reference counting via sibling trees.

BACKGROUND

A storage server is a computer that provides storage services relating to the organization of data on writable, storage media, such as non-volatile memories and disks. A storage server may be configured to operate according to a client/server model of information delivery to enable many clients (e.g., applications) to access the data served by the system. A storage server can employ a storage architecture that serves the data with both random and streaming access patterns at either a file level, as in network attached storage (NAS) environments, or at the block level, as in a storage area network (SAN). Storage servers store data on various types of non-volatile storage media such as, for example, relatively high latency (i.e., longer access times) hard disk drive devices (HDDs) and relatively low latency (i.e., shorter access times) solid-state devices (SSDs) such as flash memory or DRAM.

A network storage system may be a monolithic, non-distributed storage server, or it may be distributed across two or more physical platforms. Furthermore, a network storage system can operate as one of multiple storage servers in a storage server cluster, to provide increased scalability. A client may execute an application, such as a database application, that "connects" to the storage system over a computer network, such as a point-to-point link, shared local area network (LAN), wide area network (WAN), or virtual private network (VPN) implemented over a public network such as the Internet. Each client may request the data services of the storage system by issuing access requests (read/write requests) as file-based and block-based protocol messages (in the form of packets) to the system over the network.

Some network storage systems use hierarchical (tree-shaped) data structures to organize the data and metadata that they store. The data and metadata may be stored and managed in units called "blocks," where each block is a node in the hierarchical data structure. The hierarchical data structure can have internal nodes that reference other nodes within the data structure and leaf nodes which do not reference other nodes. The metadata may include reference counts associated with the nodes/blocks. A reference count indicates the number of references (e.g., pointers) to a particular node.

A reference count is an important parameter to track in a storage system in which nodes can be shared by two or more entities, such as files, logical units, etc. Nodes may be shared as a result of, for example, creating snapshots or clones of a file or a file system. When a node is shared by two or more entities (e.g., files), there will generally be multiple references to that node, e.g., one reference for each file that includes the data associated with the node. The reference counts can be used for a variety of purposes, such as for determining when a node is no longer referenced and therefore can be deleted or for identifying inaccessible nodes.

Some storage systems store the reference counts in the hierarchical data structure along with the nodes to which the reference counts correspond; this approach is sometimes called "hierarchical reference counting." However, the traditional implementations of reference counts using a hierarchical structure suffer from significant drawbacks that make them unsuitable for use in many scenarios. For example, upon modification of data after cloning, the ability of multiple objects to reference a particular node may be broken. As a result, the explicit references and reference counts in the lower levels of the reference counting hierarchy (e.g., to the modified node's children) have to be updated. Consequently, small data modifications can produce a large number of reference count updates (i.e., an update "storm") when the reference counts in lower levels of the reference counting hierarchy are updated. As a result, the traditional hierarchical reference counting schemes utilize a significant portion of the storage system resources such as input/output (IO) utilization, CPU cycles, and memory resources. As such, there are a number of challenges and inefficiencies found in network storage servers that use traditional hierarchical reference counting.

SUMMARY

Various embodiments introduced here generally relate to systems and methods for hierarchical reference counting via sibling trees. In some embodiments, a new data structure is provided. The new data structure, together with its associated operations, is able to efficiently maintain reference counts to store data. As a result, the new data structure significantly reduces input/output (IO) operations.

In some embodiments, a network storage system maintains a hierarchical data structure. The hierarchical data structure represents data stored in the network storage system and can include a plurality of nodes. Each of the plurality of nodes can include a reference count indicating a number of references to that node. A second data structure (or field) can be used to track reference counts of the plurality of nodes in the hierarchical data structure in response to a modification of a particular node in the hierarchical data structure. As a result, updates to the reference count of any child node of the particular node are avoided in response to the modification.

Embodiments of the present invention also include other methods, systems with various components, and computer-readable storage media containing sets of instructions to cause one or more processors to perform the methods, variations of the methods, and other operations described herein. While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
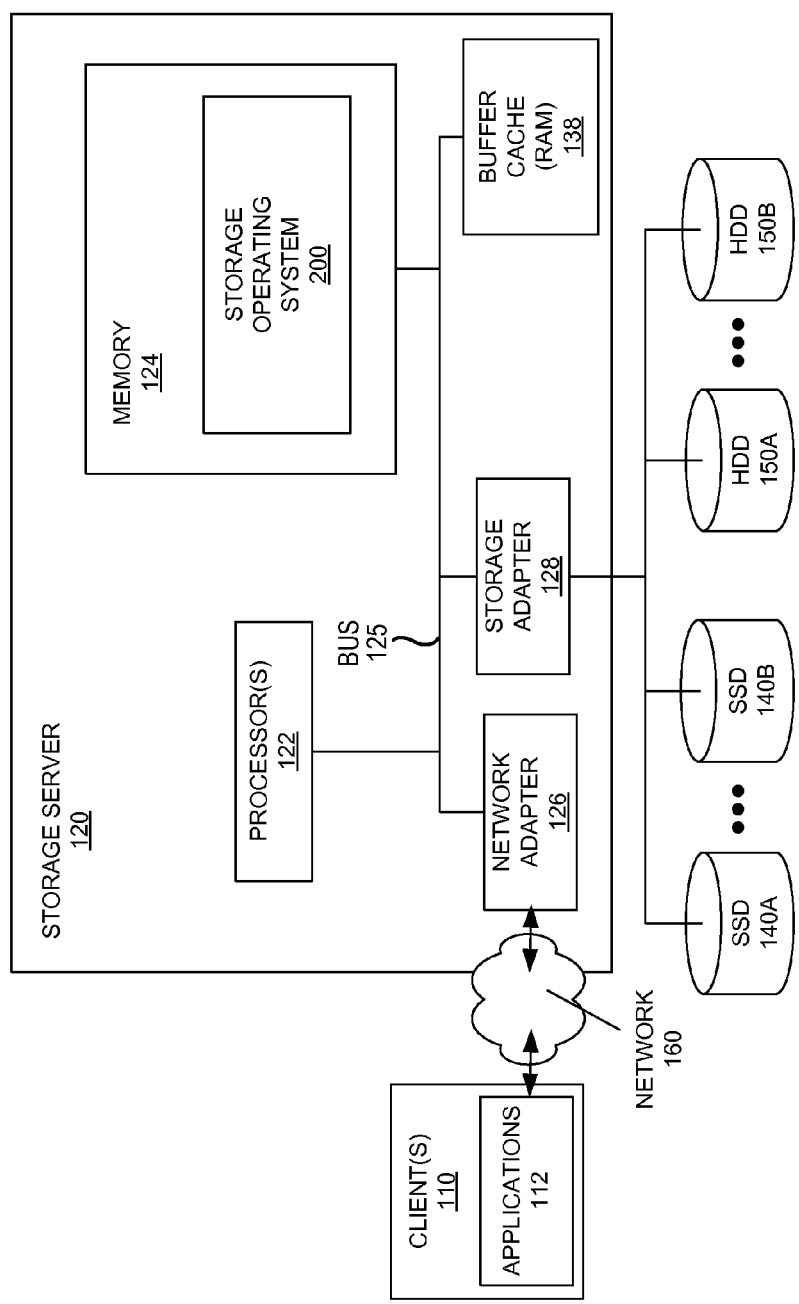
FIG. 1 shows a block diagram of a storage system in which some embodiments may be implemented or utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments generally relate to storage system data structures. More specifically, some embodiments relate to systems and methods for hierarchical reference counting via sibling trees. Various embodiments of the techniques introduced here generally relate to file systems with a hierarchically reference counted file system structure. A "file system," as the term is used herein, is a structured set of logical containers of data, which may be, but are not necessarily, in the form of files, directories, LUNs and/or other type(s) of logical containers. Note that the term "file system" does not imply that the data must be stored in units of "files"; for example, a file system can store and manipulate data in units of blocks and/or logical units without reference to or use of any files per se.

Many file systems that support snapshots, cloning, and de-duplication do so using reference counts to blocks. A snapshot is a persistent point-in-time image of a set of data. A clone is writeable snapshot. De-duplication is a technique used for eliminating redundant data. In the case where multiple blocks are being (logically) duplicated at the same time, such as during a snapshot or clone, block sharing and reference counting can be used higher up in the file system tree. Using hierarchical reference counts as discussed below allows file system snapshots, clones, and de-duplication to be implemented by the same set of data structures, potentially unifying what is, in effect, three different methods and data structures in traditional storage systems.

Various embodiments of the present invention provide for a new data structure that, together with associated operations, is able to efficiently maintain reference counts to stored data. There have been previous data structures to maintain hierarchical reference counts, but they suffer from significant drawbacks that make them unsuitable for use. For example, upon modification of data within the data structure, the sharing of a particular node may be broken and the explicit sharing and reference counts are pushed downward in the tree to the node's children. One impediment to using the reference counts is that small data modifications can produce a large number of reference count updates (i.e., an update storm) when the reference counts are pushed downward, causing a large amount of IO. Various embodiments of the data structure proposed here remove and/or reduce many of the inefficiencies present in use of these traditional data structures.

Various embodiments of the techniques presented here reduce the IO overhead substantially, making the reference counting feasible. At the same time, various embodiments can preserve nearly all of the benefits that traditional schemes provide. The data structure presented here is not constrained to working on B+ trees, and is applicable to any directed acyclic graph (DAG-type) structure where reference counts are used.

Various embodiments of the present invention use a data structure to maintain a "sibling pointer" (pointing to the sibling node as a way to avoid reference count updates) and "sibling count" when nodes in the tree diverge as opposed to directly manipulating the reference counts of the children of the diverging nodes. The use of sibling pointers and sibling counts decreases the "update storm" problem by a factor of the fan out of the tree structure (a number typically in the hundreds) since only the sibling count is adjusted. As discussed in more detail below, there are also several additional improvements, including delete counts, forward pointers, and sibling flags that increase the storage efficiency by allowing easier space reclamation. These features and advantages, along with others, found in various embodiments make hierarchal reference counting via sibling trees even more advantageous in even the most resource constrained environments.

The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In this description, the phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily all refer to the same embodiments.

FIG. 1 shows a block diagram of an exemplary storage system 100 in which some embodiments may be utilized. In the embodiments shown in FIG. 1, storage system 100 includes a storage server 120 having one or more processors 122, a memory 124, a network adapter 126, a storage adapter 128 and buffer cache 138 interconnected by a system bus 125. The storage server 120 can be a computer that provides storage services relating to the organization of information on writable, persistent storage media, such as SSDs and HDDs. The storage server 120 also includes a storage operating system 200 that implements a file system to logically organize the stored data as a hierarchical structure of logical data containers (e.g., volumes, logical units, directories and/or files) on the electronic storage media 140 and magnetic storage media 150.

It will be understood by those skilled in the art that the techniques introduced here may apply to any type of special-purpose computer (e.g., file server or storage serving appliance) or general-purpose computer embodied as, or having a storage server including a standalone computer or portion thereof. While FIG. 1 illustrates a monolithic, non-distributed storage server 120, various embodiments are applicable to other types of storage configurations (e.g., cluster storage configurations). Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements, including a storage server that provides file-based access to data, block-based access to data, or both.

Memory 124 includes storage locations that are addressable by the processor(s) 122 and adapters and can store software programs and data structures to carry out the techniques described herein. Processor(s) 122 and adapters may, in turn, include processing elements and/or logic circuitry configured to execute the software programs and manipulate the data structures. The storage operating system 200, portions of which is typically resident in memory 124 and executed by the processor(s) 122, functionally organizes the storage server by invoking storage operations in support of software processes executing on the server 120. It will be apparent to those skilled in the art that other memory mechanisms, such as various computer-readable media, may instead be used to store and execute program instructions pertaining to the embodiments described herein. The electronic storage media 140 and magnetic storage media 150 are configured to provide a persistent, writable storage space capable of maintaining data in the event of a power loss or other failure of the storage server 120. Accordingly, the electronic storage media 140 and magnetic storage media 150 may be embodied as large-volume memory arrays.

The network adapter 126 includes the circuitry and mechanical components needed to connect the storage server 120 to a client 110 over a computer network 160, which may include a point-to-point (P2P) connection or a shared medium. Network 160 can be any group of interconnected devices capable of exchanging information. In some embodiments, network 160 may be as few as several personal computers, special purpose computers, and/or general purposed computers on a Local Area Network (LAN) or as large as the Internet. In some cases, network 160 may be comprised of multiple networks (private and/or public), even multiple heterogeneous networks, such as one or more border networks, broadband networks, service provider networks, Internet Service Provider (ISP) networks, and/or Public Switched Telephone Networks (PSTNs), interconnected via gateways operable to facilitate communications between and among the various networks.

Client(s) 110 may be a general-purpose computer configured to execute applications 112, such as a database application. Moreover, the client(s) 110 may interact with the storage server 120 in accordance with a client/server model of information delivery. That is, the client(s) 110 may request the services of the storage server 120 and the system may return the results of the services requested by the client 110, such as by exchanging packets over the network 160. The client(s) 110 may issue packets including file-based access protocols such as the Common Internet File System (CIFS) protocol or Network File System (NFS) protocol over TCP/IP when accessing information in the form of files. Alternatively, the client(s) 110 may issue packets including block-based access protocols such as the Small Computer Systems Interface (SCSI) protocol encapsulated over TCP (iSCSI) and SCSI encapsulated over Fibre Channel Protocol (FCP) when accessing information in the form of LUNs or blocks.

The storage adapter 128 cooperates with the storage operating system 200 executing on the storage server 120 to access information requested by the client 110. The information may be stored on the electronic storage media 140 and magnetic storage media 150, which are illustratively embodied as SSDs and HDDs. The storage adapter includes input/output (IO) interface circuitry that couples to the SSD 140 and HDD 150 over an IO interconnect arrangement, such as a conventional high-performance Fibre Channel serial link topology. The information is retrieved by the storage adapter 128 and, if necessary, processed by the processor(s) 122 (or the adapter 128) prior to being forwarded over the system bus 125 to the network adapter 126 where the information is formatted into a packet and returned to the client 110.

In the illustrated embodiments, buffer cache 138 is coupled with the memory 124 over the system bus 125. However, this is by way of example and not of limitation as the buffer cache 138 may be coupled with the memory using, for example, a point-to-point connection. In addition, the buffer cache 138 may be separate from the memory 124 (as illustrated), part of the memory 124, or part of the processor(s) 122. Generally, a buffer cache memory, such as buffer cache 138, includes a smaller, lower-latency (faster) memory such as RAM (e.g., DRAM), operable to reduce the average time to perform a memory access. The buffer cache typically stores copies of the data from the most frequently used locations in memory 124 so that when a memory access is performed, the buffer cache may first be checked to determine if required data is located therein, and, if so, the data may be accessed from the buffer cache 138 instead of the persistent storage media, such as SSDs or HDDs. In this manner, a buffer cache, such as buffer cache 138, reduces memory access times by avoiding having to access persistent storage to obtain the data.

Figure 2:
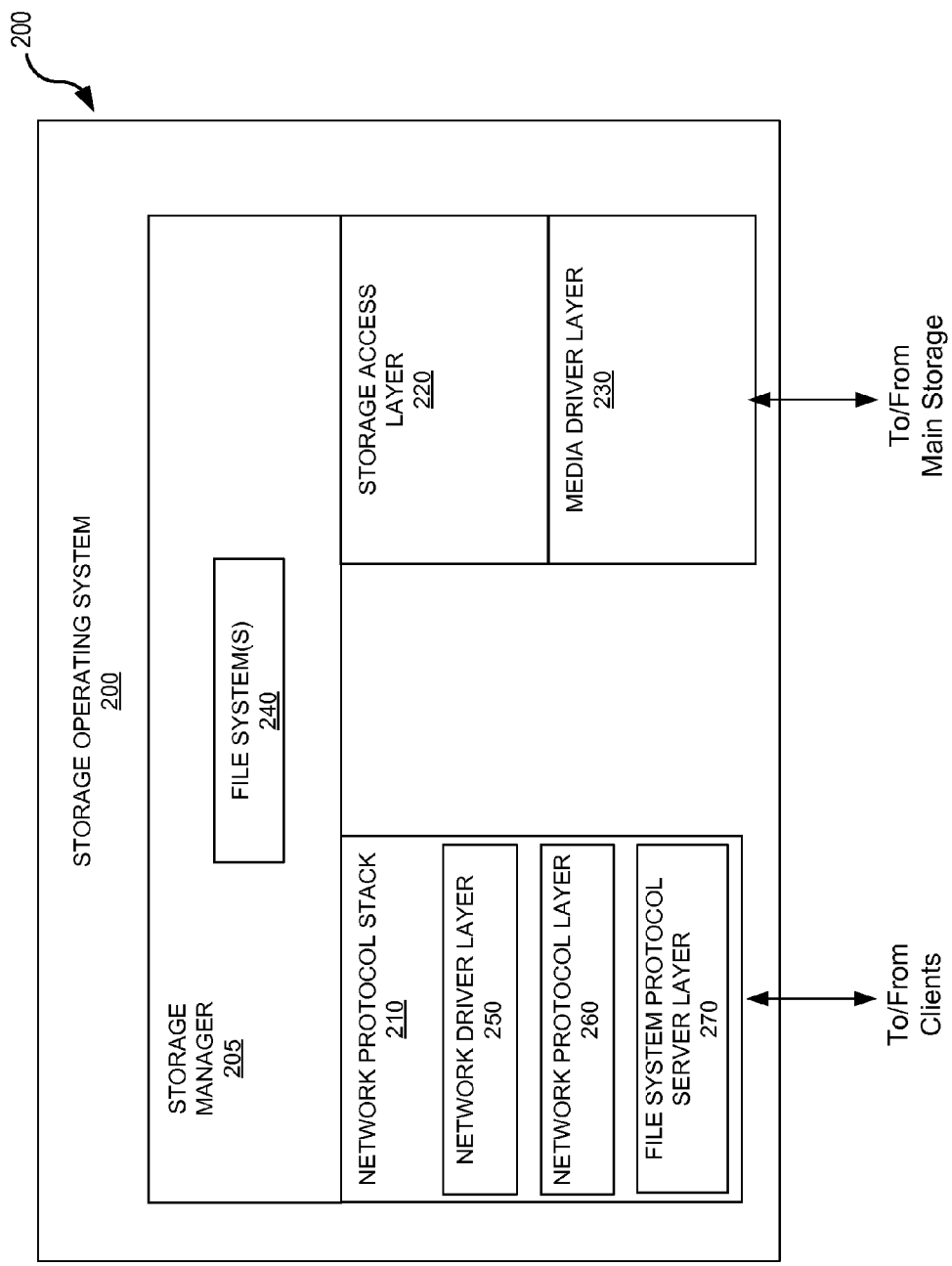
FIG. 2 shows a block diagram of a storage operating system.

FIG. 2 shows an example of the storage operating system 200. As used herein, the term "storage operating system" generally refers to the computer-executable code operable on a computer or other processing platform to perform a storage function that manages data access. The storage operating system can also be implemented as a microkernel, an application program operating over a general-purpose operating system such as UNIX® or Windows NT®, or as a general-purpose operating system configured for the storage applications as described herein. In the illustrated embodiments, the storage operating system includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.).

In addition, the storage operating system 200 includes a storage access layer 220 that implements a storage media protocol such as a Redundant Array of Independent Disks (RAID) protocol, and a media driver layer 230 that implements a storage media access protocol such as, for example, a Small Computer Systems Interface (SCSI) protocol. Any and all of the modules of FIG. 2 can be implemented as a separate hardware component. For example, the storage access layer 220 may alternatively be implemented as a parity protection RAID module and embodied as a separate hardware component such as a RAID controller.

Bridging the storage media software layers with the network and file system protocol layers is a storage manager 205 that implements one or more file system(s) 240. In one embodiment, the storage manager 205 implements data layout algorithms that improve read and write performance to the electronic storage media 140 and magnetic storage media 150. For example, storage manager 205 can be configured to perform initial placement and relocation of the data among multiple tiers of heterogeneous storage media of a hybrid storage aggregate and to allow clients to access any subsystems configured to perform the storage functions described herein.

Figure 3A:
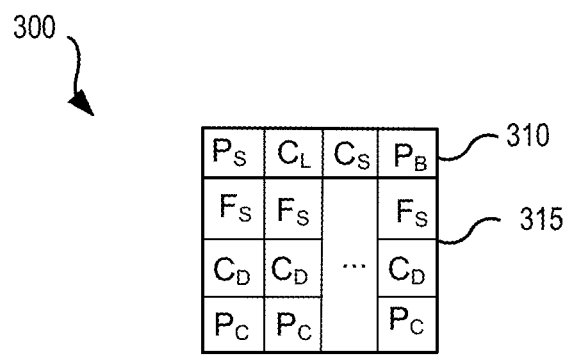
FIGS. 3A and 3B illustrate an internal node structure and a leaf node structure in accordance with the hierarchical data structure.
Figure 3B:
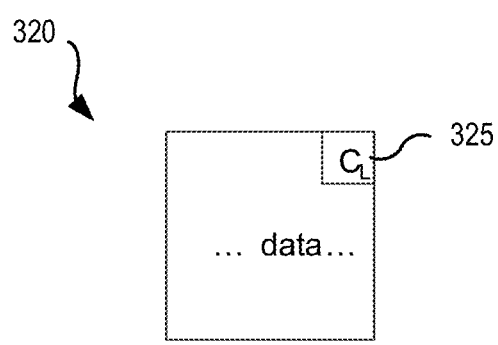

FIGS. 3A and 3B illustrate an internal node structure 300 and a leaf node structure 320 in accordance with the hierarchical data structure. The nodes illustrated in FIGS. 3A and 3B can be part of a plurality of nodes within the hierarchical data structure to store and organize data. In some embodiments, the plurality of nodes can be associated with a variety of fields including a reference count indicating a number of references to that node. Examples include, but are not limited to, a link count, a sibling count, a sibling pointer, a back pointer, a sibling flag, a delete count, and a child pointer.

A link count tracks the number of nodes that directly point to a node. A sibling count tracks the number of other nodes that have the node as a pre-image (i.e., "siblings"). A pre-image of a copied node is the original node from which a copy was created. A sibling pointer points to a node's pre-image (i.e., sibling). A forward pointer points from a pre-image to one of the desired copies. A sibling flag indicates whether an associated child pointer is identical to its sibling's corresponding child pointer. A delete count tracks the number of nodes that consider this node their sibling and no longer have a pointer identical to this node. A child pointer points to a child node in the data structure (internal or leaf).

In accordance with various embodiments, the internal node structure 300 includes fields that are per node (as illustrated in row 310) and some fields that are per child are illustrated in the columns 315. In some embodiments, as illustrated in row 310, a sibling pointer ($P_S$), a link count ($C_L$), a sibling count ($C_S$), and/or a back pointer ($P_B$) can be associated with each node. In some embodiments, the fields can either be stored directly in each node or in a different data structure. As one example, a reference count file may be used to store the link counts for all of the nodes. For each child node associated with the internal node, a recordation as illustrated in columns 315 can be created that include one or more of a sibling flag ($F_S$), a delete count ($C_D$), and/or a child pointer ($P_C$). Leaf node, such as 320, can be used to store data and can have a data structure or field to track a link count ($C_L$) 325.

Figure 4:
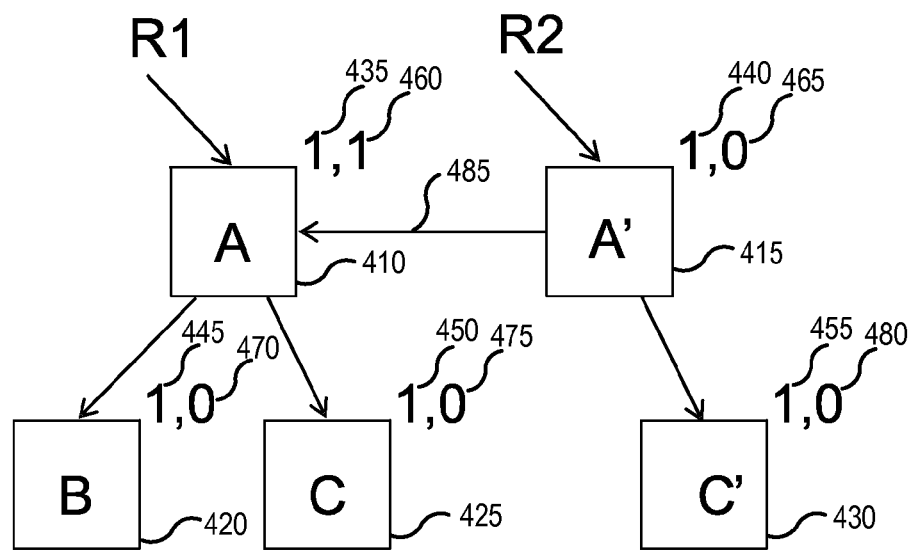
FIG. 4 is block diagram an example of a set nodes with reference counts and reference pointers.

FIG. 4 is block diagram illustrating an example of a set of nodes 410-430 with reference counts and reference pointers. Node 410 is a sibling (i.e., a pre-image) of node 415 while nodes 420 and 425 are children of node 410. Node 430 is a child node of node 415. This scenario could arise, for example, when a first reference R1 is cloned. In response to R1 being cloned, link count 435 would be incremented and the first reference R1 and second reference R2 would point to node 410. When block 425 is overwritten via R2 (i.e., the clone diverges), then node 415 would be created along with child node 430.

The reference counts illustrated in the embodiments shown in FIG. 4 include link counts 435-455 along with sibling counts 460-480. Each of the nodes 410-430 have one direct reference which is tracked by the link counts 435-455. In addition, node 410 has a sibling created from the clone which is tracked by sibling count 460. None of the other nodes illustrated are siblings, and, as such, sibling counts 465-480 having values of zero indicate the nodes have no siblings. A reference pointer 485 is associated with node 415 that points back to the sibling node 410.

Figure 5:
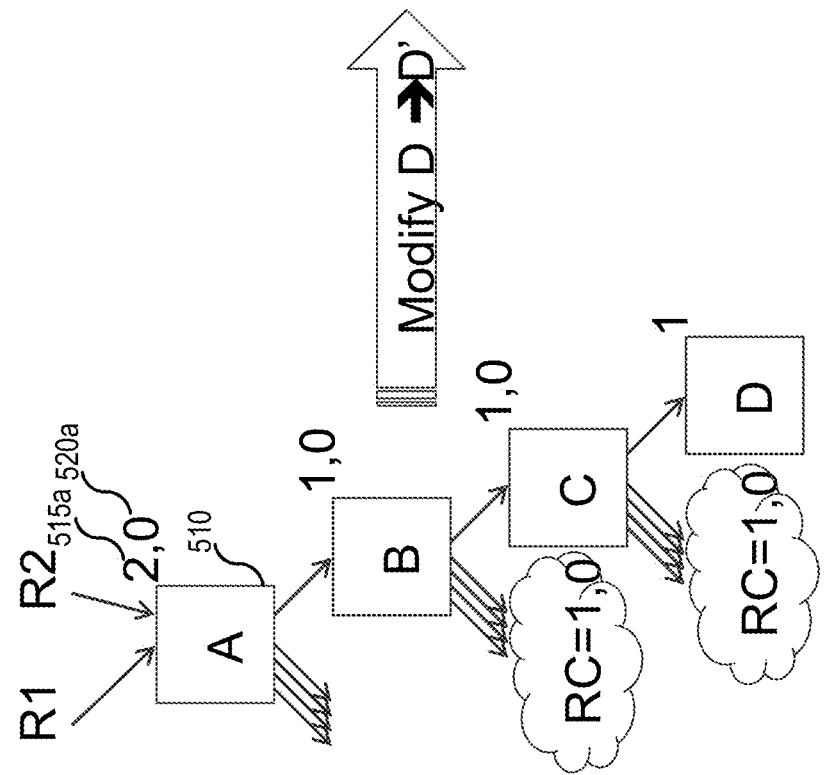
FIG. 5 illustrates how a modification is tracked using the hierarchical data structure that uses sibling trees.
Figure 5:
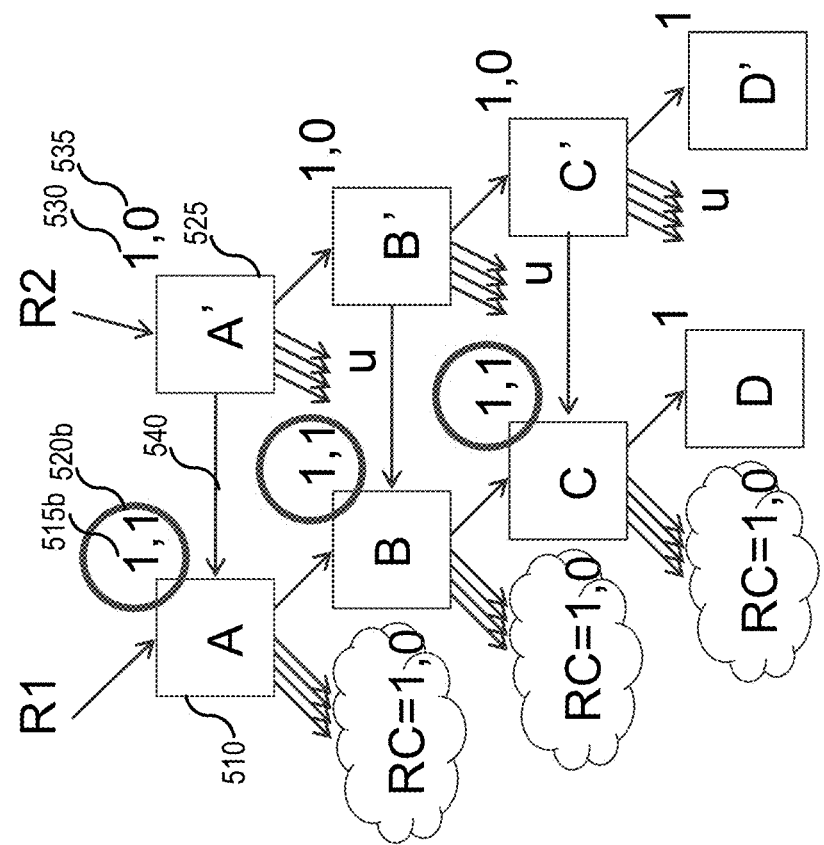

FIG. 5 illustrates how a modification is tracked using embodiments of the hierarchical data structure. As illustrated in FIG. 5, a first pointer R1 and a second pointer R2 point to a particular node 510 before a modification. At this point, the link count 515*a* indicates that there are two direct references to particular node 510. In addition, sibling count 520*a* indicates that particular node 510 is not a pre-image of any other node. When a child node associated with particular node 510 is being modified, such as due to a write operation, a copy of the particular node can be created.

In response to the write operation, the second pointer R2 can be updated to point to the copy of the particular node 525, while the first point R1 points to particular node 510. Link count 515*b* is updated to indicate that there is now only one direct reference to particular node 510. In addition, sibling count 520*b* is updated to indicate that particular node 310 is a pre-image of one other node. The copy of the particular node has a link count 530 of one from the one direct reference of R2. The sibling count 535 indicates that no other node has the copy of the particular node 525 as a pre-image. Particular node 525 is a copy of node 510, and a sibling pointer 540 is associated with the node in the data structure that points back to the particular node 510. FIG. 5 also illustrates how other the sibling counts and link counts are updated with other child nodes.

Figure 6:
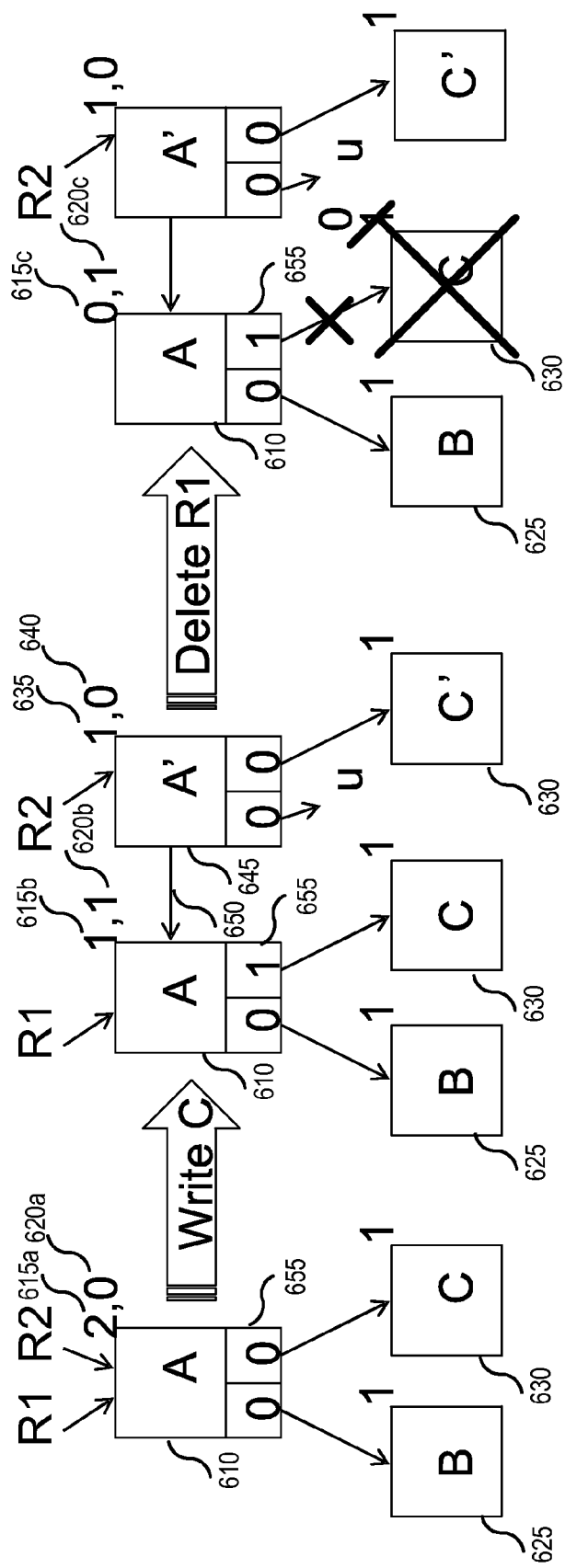
FIG. 6 illustrates how a delete counter can be used as part of the hierarchical data structure.

FIG. 6 illustrates how a delete counter can be used as part of the hierarchical data structure. A first pointer R1 and a second pointer R2 point to a particular node 610 before a modification. At this point, the link count 615*a* indicates that there are two direct references to particular node 610. In addition, sibling count 620*a* indicates that particular node 610 is not a pre-image of any other node. In addition, for each of the two child nodes 625 and 630, a separate delete count indicates the number of siblings that no longer reference this child. When a child node such as 625 or 630 associated with particular node 610 is modified, a copy of the particular node 610 can be created.

For example, when a write occurs to child node 630, a copy 645 of the particular node 610 is created. The second pointer R2 can be updated to point to the copy 645 of the particular node 610, while the first pointer R1 points to particular node 610. Link count 615*b* is updated to indicate that there is now only one direct reference to particular node 610. In addition, sibling count 620*b* is updated to indicate that particular node 610 is a pre-image of one other node. The copy 645 of the particular node 610 has a link count 635 of one from the one direct reference of R2. The sibling count 640 indicates that no other node has the copy 645 of the particular node 610 as a pre-image. The copy 645 of the particular node 610 is a copy of node 610, and a sibling pointer 650 is associated with the node in the data structure that points back to the particular node 610.

After the write operation, delete count 655 which is associated with child node 630 is increased by one to indicate that sibling 645 no longer references child node 630. Then, when the reference R1 is deleted, the delete count 655 can be used to determine that various nodes can be deleted. For example, in some embodiments, when a link count that tracks a number of direct references to the particular node and a sibling count that tracks a number of copies of the particular node both indicate no references, then the particular node can be freed as nothing points to that node. When the particular node is freed, then any pointers in the copy of the particular node are resolved to point directly to any child nodes associated with the particular node.

In some embodiments, a child pointer that points to a child node can be freed using a determination based on the delete count and the sibling count. For example, a difference between the delete count and a sibling count can be computed in various embodiments. If the link count and the difference between the delete count and the sibling count indicate no references to the child node (i.e., only siblings point to the node and none of them use this child), the child pointer can be freed.

Link count 615*c* is updated after the deletion of direct reference R1 to indicate that there is now only no direct reference to particular node 610. In addition, sibling count 620*c* remains unchanged indicating that particular node 610 is a pre-image of one other node. Similarly, the sibling count and link count for the copy of the particular node remain unchanged.

Figure 7:
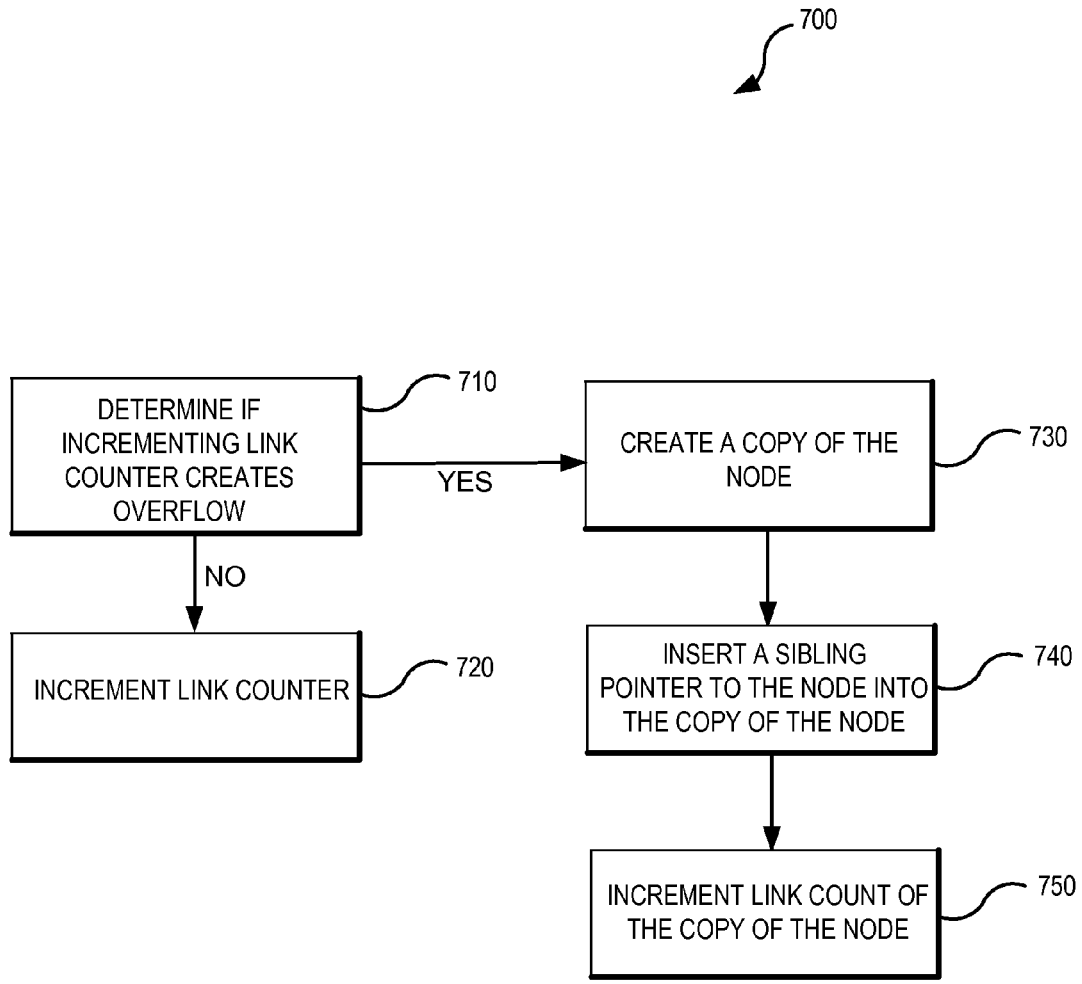
FIG. 7 is a flow chart illustrating a process for handling counter overflows within the hierarchical data structure.

FIG. 7 is a flow chart 700 illustrating a process for handling counter overflows within the hierarchical data structure. In some embodiments, the operations illustrated in FIG. 7 can be performed by an overflow module, processor, or other system component. As illustrated in FIG. 7, determination operation 710 determines incrementing a link count would create an overflow. If determination operation 710 determines that an overflow would not result, the link count is incremented during incrementing operation 720. If, however, determination operation 710 determines that an overflow would result from incrementing the link count, determination operation 710 branches to copy operation 730. Copy operation 730 creates a copy of the node and insertion operation 740 inserts a sibling pointer to the node. Then, incrementing operation 750 increments the link count associated with the copy of the node created by copy operation 730. Various embodiments use a similar feature of creating a copy of the node for other counter overflows.

Figure 8:
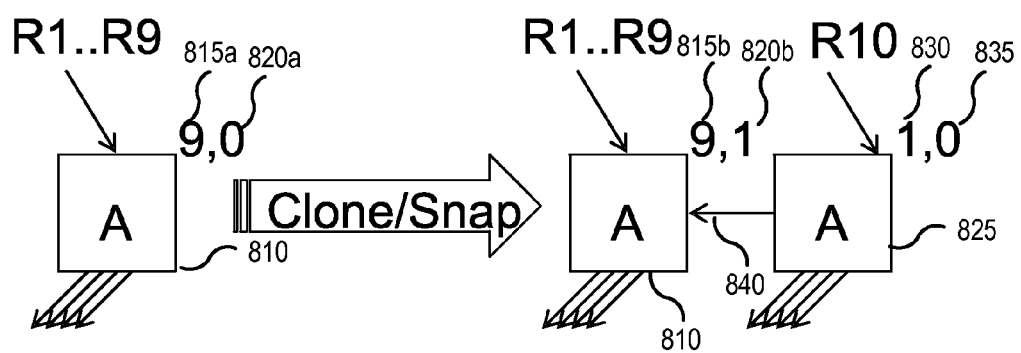
FIG. 8 illustrates how a sibling pointer and sibling count within the hierarchical data structure can be used to handle counter overflows.

FIG. 8 graphically illustrates how a sibling pointer and sibling count within the hierarchical data structure can be used to handle counter overflows. The operations described in reference to FIG. 8 can be performed by one or more modules or components. For example, in various embodiments, the storage manager may include an overflow module to generate a copy of the first node when the link count would overflow if incremented. Suppose the link count can only count to nine without creating an overflow. In FIG. 8, there are nine direct references R1 to R9 to node 810. Link count 815*a* indicates that there are nine direct references and sibling count 820*a* indicates there are no siblings. When an additional direct reference R10 to node 810 is added the link counter would overflow. To prevent the overflow, some embodiments, create a copy of the node 825 with the direct reference R10. The link count 830 indicates there is one direct reference and the sibling count 835 indicates there are no siblings. A sibling pointer 840 is added that points to node 810. Link count 815*b* remains at nine and sibling count 820*b* indicates that node 810 is a pre-image of one node.

Figure 9:
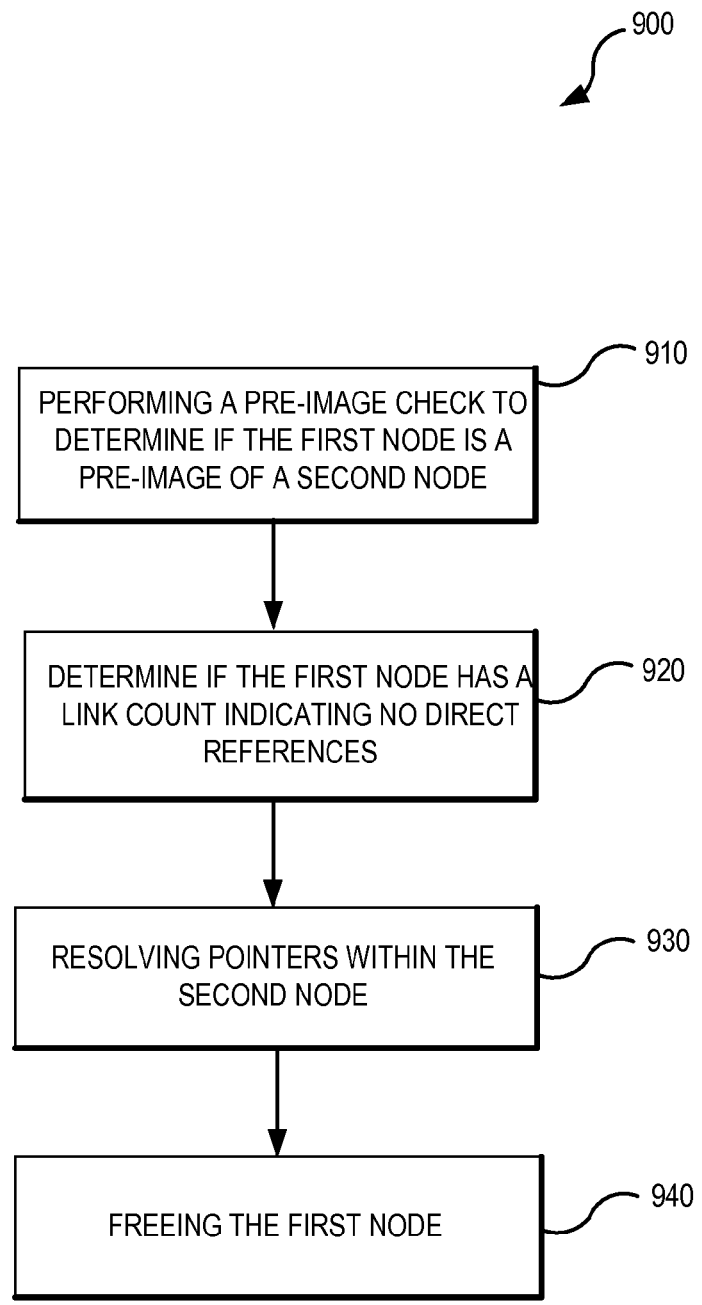
FIG. 9 is a flow chart illustrating a process for freeing nodes within the hierarchical data structure.

FIG. 9 is a flow chart 900 illustrating a process for freeing nodes within the hierarchical data structure. Various components of a network storage operating system can be used to implement and execute the operations described in FIG. 9. For example, in some embodiments a processor associated with the storage system can be used to perform pre-image check operation 910. During pre-image check operation 910 a determination is made whether the particular node within a data structure has a sibling count indicative of the first node being a pre-image of a second node. Reference status operation 920 can be used to determine a direct reference status. In accordance with various embodiments, the direct reference status indicates whether the particular node has a link count indicating no direct references to the first node. When the pre-image check indicates the particular node is the pre-image and the direct reference status indicates that the particular node has no direct references, a pointer within the second node can be resolved during resolution operation 930. Then, the particular node can be freed during node freeing operation 940.

Figure 10:
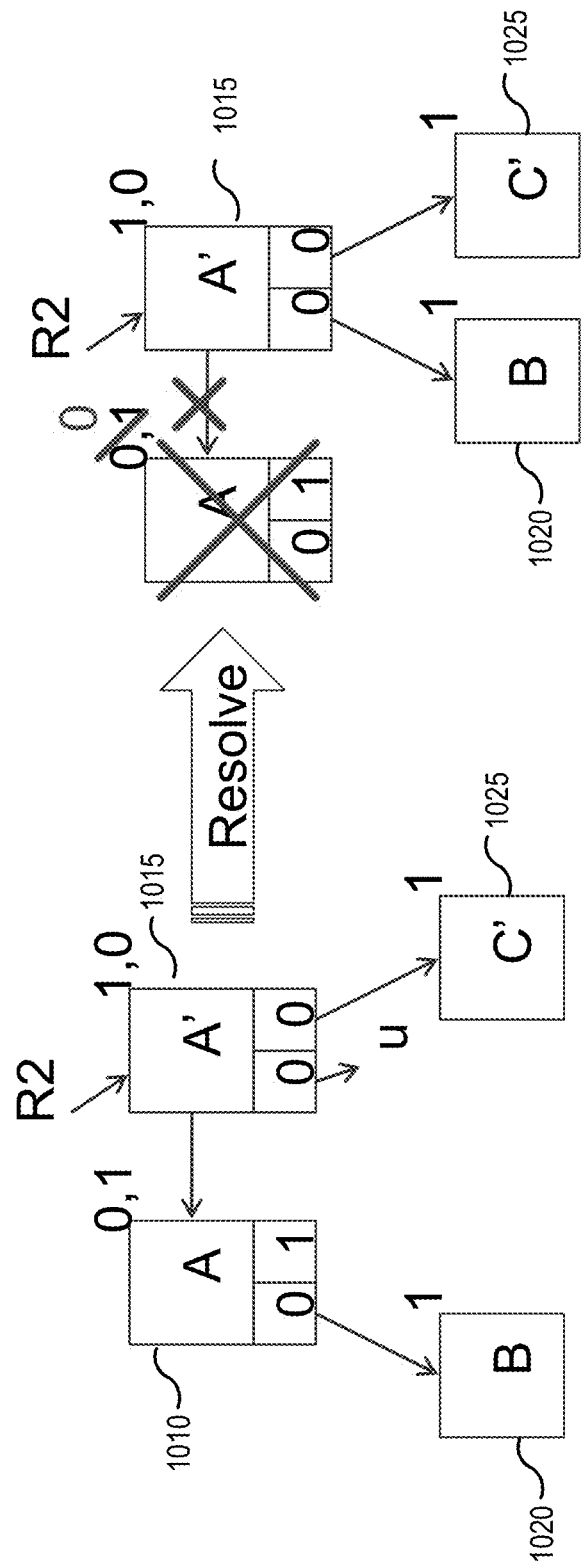
FIG. 10 illustrates how a node can be freed.

FIG. 10 graphically illustrates how a node can be freed using the operations discussed in FIG. 9. As illustrated in FIG. 10, node 1010 has no direct references. Node 1015 is a copy of node 1010 and has one direct reference R2 and a child node 1025. As such, node 1010 has a sibling count to indicate that node 1010 is a pre-image of node 1015. Once a determination is made that the link count indicates no direct references and the sibling count indicates the node is a sibling, resolution operation 930 resolves a pointer within node 1015 to point directly to node 1020. Node 1010 can be freed and the sibling pointer can be removed.

Figure 11:
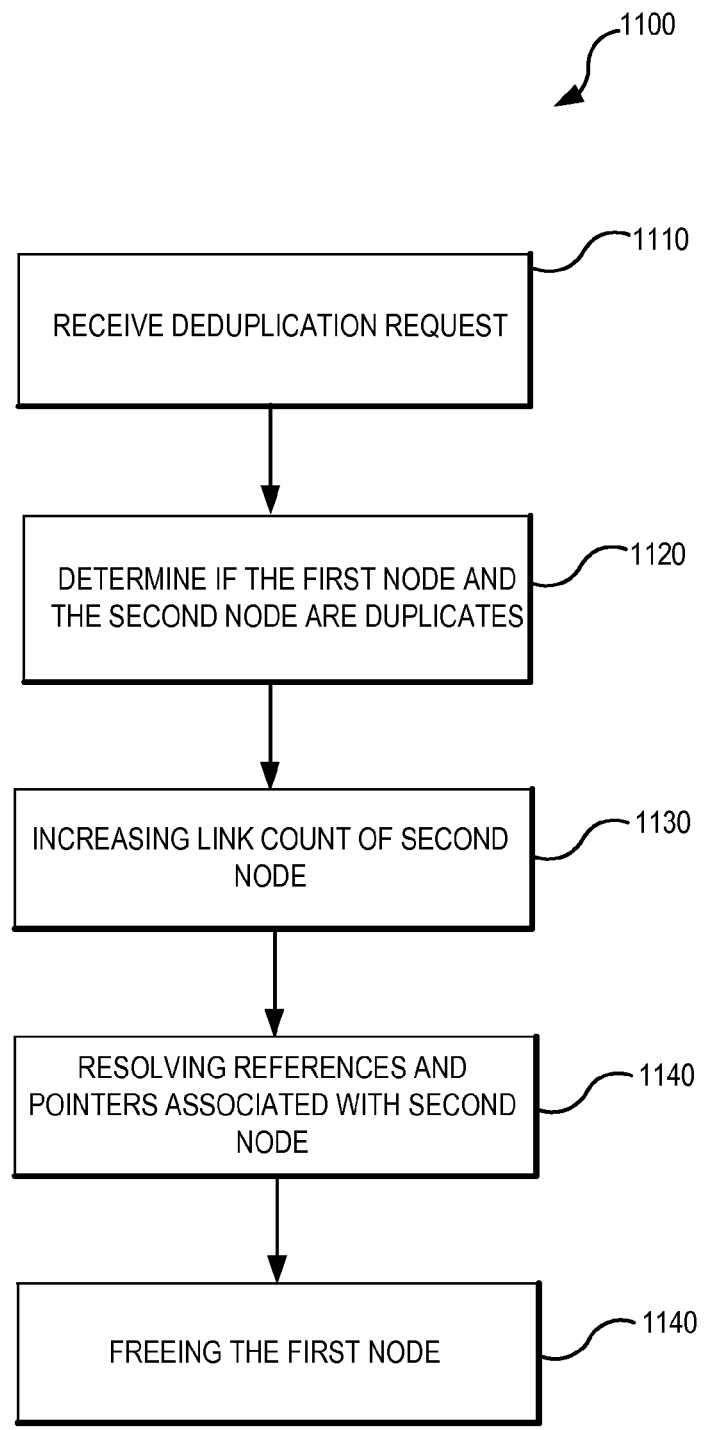
FIG. 11 is a flow chart illustrating a process for freeing nodes in response to deduplication request.

FIG. 11 is a flow chart 1100 illustrating a process for freeing nodes in response to a deduplication request. The operations illustrated in FIG. 11 can be performed by one or more components (e.g., processor), engines, and/or modules associated with the network storage system. In response to a deduplication request being received during receiving operation 1110, determination operation 1120 determines if a first node and a second node are duplicates. Incrementing operation 1130 increases the link count of the second node. Then resolution operation 1140 resolves references and points associated with the second node. Then, freeing operation 1150 frees the first node.

Figure 12:
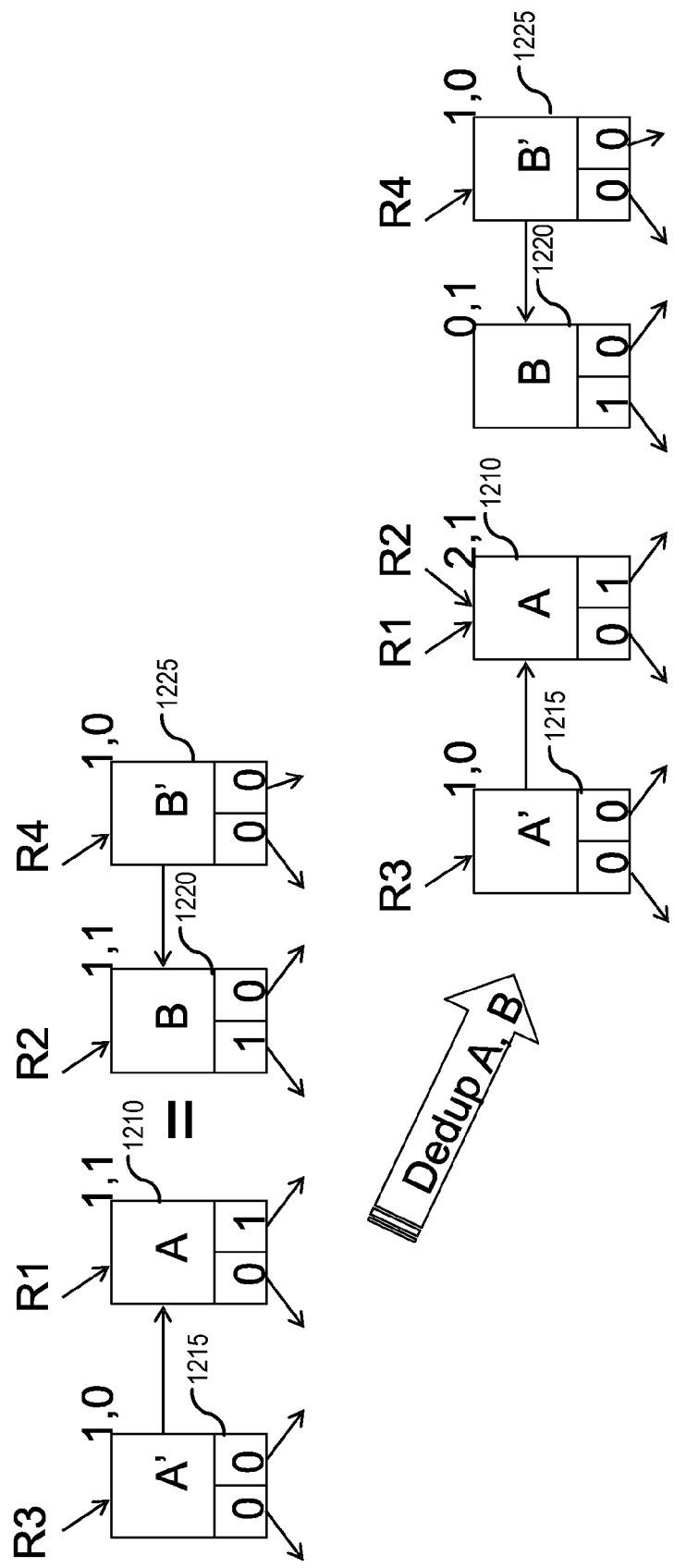
FIG. 12 illustrates how a node can be freed in response to deduplication request.

FIG. 12 graphically illustrates how a node can be freed in response to a deduplication request. Node 1210 is a pre-image of node 1215. Both nodes 1210 and 1215 have one direct reference which is indicated by the link count. The sibling count of node 1210 is one to indicate that node 1215 is a copy. Node 1220 is a duplicate of node 1210 and has one copy, node 1225. In response to a deduplication request, a determination is made that node 1220 is a duplicate of node 1210. Then direct reference to node 1220 is moved to node 1210 and the link count associated with node 1210 is incremented to indicate the two direct references. The link count for node 1220 is decreased since the direct reference was removed. Node 1220 can be freed by resolving any pointers.

Figure 13:
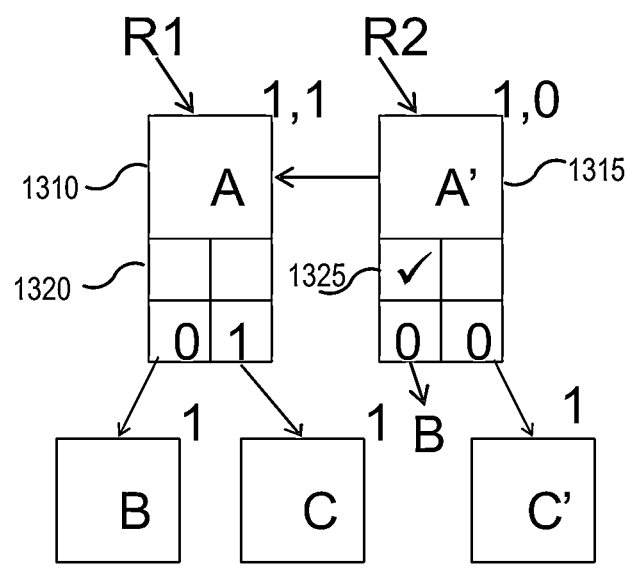
FIG. 13 illustrates how sibling chains can be tracked using copy indicators.

FIG. 13 illustrates how sibling chains can be tracked using copy indicators or sibling flag. FIG. 13 shows two nodes 1310 and 1315. Node 1315 is a copy of node 1310 and each node has one direct reference indicated by the link counts associated with each node. Node 1310 has a sibling count to indicate the one copy. In accordance with various embodiments, the hierarchical data structure can include an additional field 1320 associated with each child node. The additional field indicates when a child pointer is a direct copy from another node. The copy indicator 1325 associated with node 1315 indicates that the pointer is a copy of the pointer from node 1310. One advantage of the copy indicators is that they can prevent multiple hops on read operations. Another advantage of the copy indicators is that it preserves ability to do easy snap-diff even when the pointer is present.

Figure 14:
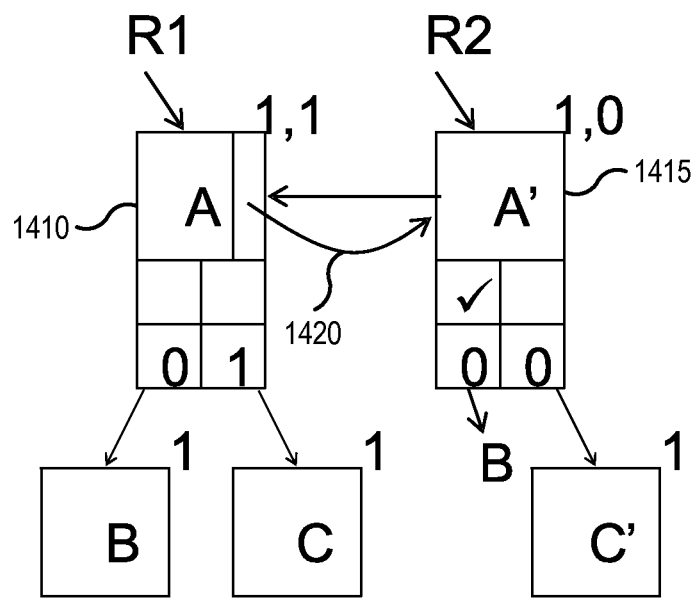
FIG. 14 illustrates how forward pointers can be tracked and used within the hierarchical data structure.

FIG. 14 illustrates how forward pointers can be tracked and used within the hierarchical data structure. FIG. 14 shows two nodes 1410 and 1415. Node 1415 is a copy of node 1410 and each node has one direct reference indicated by the link counts associated with each node. Node 1410 has a sibling count to indicate the one copy. In accordance with various embodiments, the hierarchical data structure can include an additional field 1420 to store a forward pointer. The forward pointer improves the system's ability to free sibling only nodes (i.e., nodes with no direct references). For example, a forward pointer allows node 1415 to be located when R1 is removed, resulting in the removal of the last link to 1410. Using the forward pointer to locate node 1415, the ownership of node B can be transferred to node 1415 by clearing copy indicator 1415. Some embodiments keep one forward pointer to handle the most prevalent case where there is no direct count and one sibling count. This case can be proactively resolved with the last direct link is removed.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
    maintaining, in a network storage system, a hierarchical data structure representing data stored in the network storage system, the hierarchical data structure including multiple nodes, each of the multiple nodes including a reference count indicating a number of references to that node;
    using a second data structure to track reference counts of the multiple nodes in the hierarchical data structure in response to a modification of a particular node in the hierarchical data structure, so as to avoid having to update the reference count of any child node of the particular node in response to the modification, wherein the second data structure includes a delete count associated with a child pointer that points to a child node; and
    incrementing the delete count to track removed references to the child node.

2. The method of claim 1, wherein the second data structure also includes a link count to track a number of direct references to the particular node.

3. The method of claim 1, further comprising:
    monitoring the second data structure for an indication that no other node references or points to the particular node; and
    freeing the particular node upon determining that the second data structure indicates that no other node references the particular node.

4. The method of claim 3, wherein monitoring the second data structure includes monitoring a link count that tracks a number of direct references to the particular node and a sibling count that tracks a number of copies of the particular node.

5. The method of claim 3, wherein freeing the particular node includes resolving pointers in a copy of the particular node to point directly to any child nodes associated with the particular node.

6. The method of claim 1, further comprising
    computing a difference between the delete count and a sibling count;
    determining if a link count and the difference between the delete count and the sibling count indicate no references to the child node; and
    freeing the child pointer when the link count and the difference between the delete count and the sibling count indicate that no other node references or points to the child node.

7. The method of claim 1, wherein the second data structure includes a sibling flag associated with a certain child pointer that points to a selected child node and the method further comprising updating the sibling flag to indicate whether the certain child pointer is identical to a corresponding child pointer in the particular node.

8. A storage system comprising:
    a processor;
    a non-volatile storage medium;
    a network interface through which to receive read requests and write requests from multiple clients via a network;
    a storage interface through which to access the non-volatile storage medium; and
    a storage manager component configured to organize and store data on the non-volatile storage media in accordance with a data structure having multiple nodes, wherein the data structure enables the storage manager to avoid reference count updates resulting from a logical duplication of a first node by using a sibling count to track a number of other nodes that have the first node as a pre-image and a link count to track a number of direct references to the first node, so as to avoid having to update the reference count of any child node of the first node, wherein the data structure includes a delete count associated with a child pointer that points to a child node, wherein the delete count is incremented to track removed references to the child node.

9. The storage system of claim 8, wherein the storage manager associates a copy bit with a pointer within the first node if the pointer was generated as a result of copying of the first node.

10. The storage system of claim 8, wherein the storage manager includes an overflow module to generate a copy of the first node when the link count would overflow if incremented, wherein the data structure associated with the copy of the first node includes a sibling pointer pointing to the first node and a second link count that is incremented instead of the link count.

11. The storage system of claim 8, wherein the storage manager includes a reclamation module to free the first node if a determination is made no other node within the data structure points to the node.

12. The storage system of claim 8, wherein the storage manager includes a reclamation module to resolve any pointers within the data structure when the first node only has a sibling count.

13. The storage system of claim 8, wherein the multiple nodes in the data structure includes a leaf node that does not point to another node and wherein the data structure does not include a sibling count or associate a sibling pointer with the leaf node.

14. The storage system of claim 8, wherein the multiple nodes in the data structure includes an internal node that points to another node.

15. The storage system of claim 8, wherein the data structure is a directed acyclic graph data structure or a b-tree.

16. A method comprising:
    maintaining, in a network storage system, a hierarchical data structure representing data stored in the network storage system, the hierarchical data structure including multiple nodes, each of the multiple nodes including a reference count indicating a number of references to that node;
    in response to a logical duplication of a particular node in the hierarchical data structure, creating in a second data structure a copy of the particular node corresponding to a point in time prior to the logical duplication, the copy of the particular node including a pointer to the particular node and including a second reference count indicating the number of references to the copy of the particular node, the second data structure including a delete count associated with a child pointer that points to a child node;
    using the second data structure to track reference counts of the hierarchical data structure without updating the reference count of the particular node or of any child node of the particular node in relation to the logical duplication; and
    incrementing the delete count to track removed references to the child node.

17. The method of claim 16, wherein the logical duplication is a result of a modification of a selected child node.

18. The method of claim 16, wherein a first pointer and a second pointer point to the particular node before the logical duplication and the method further comprising updating the second pointer to point to the copy of the particular node.

19. The method of claim 16, further comprising
    performing, using a processor associated with the storage system, a pre-image check to determine whether the particular node within a data structure has a sibling count indicative of the first node being a pre-image of a second node;
    determining a direct reference status indicating whether the particular node has a link count indicating no direct references to the first node; and
    resolving a pointer within the second node to free the particular node when the pre-image check indicates the particular node is the pre-image and the direct reference status indicates that the particular node has no direct references.

20. The method of claim 19, wherein the particular node is an internal node and is associated with a leaf node that does not include a sibling count.

21. The method of claim 19, wherein the particular node is associated with a selected child node having a child node link count and resolving the pointer includes decrementing the child node link count when the second node does not point to the selected child node.

22. The method of claim 19, wherein the particular node is associated with a selected child node and resolving the pointer includes inserting a pointer in the second node that directly points to the selected child node.

23. The method of claim 16, wherein the hierarchical data structure is a directed acyclic graph data structure.

24. The method of claim 1, wherein in response to the modification of the particular node, a copy of the particular node is created, the copy of the particular node including a sibling pointer to point to the particular node, and the method further comprising updating a sibling count in the second data structure to indicate that the copy of the particular node has the particular node as a pre-image.

\* \* \* \* \*

UNITED STATES PATENT AND TRADEMARK OFFICE
CERTIFICATE OF CORRECTION

| | |
|---|---|
| PATENT NO. | : 8,620,962 B1 |
| APPLICATION NO. | : 13/401678 |
| DATED | : December 31, 2013 |
| INVENTOR(S) | : John Strunk et al. |

It is certified that error appears in the above-identified patent and that said Letters Patent is hereby corrected as shown below:

In the Specification

In column 8, line 34, delete "310" and insert -- 510 --, therefor.

Signed and Sealed this
Twentieth Day of May, 2014

Michelle K. Lee
*Deputy Director of the United States Patent and Trademark Office*